Nov. 21, 1961 N. LAZO 3,009,992
TEST CIRCUIT FOR TELEPHONE RINGERS
Filed May 27, 1959
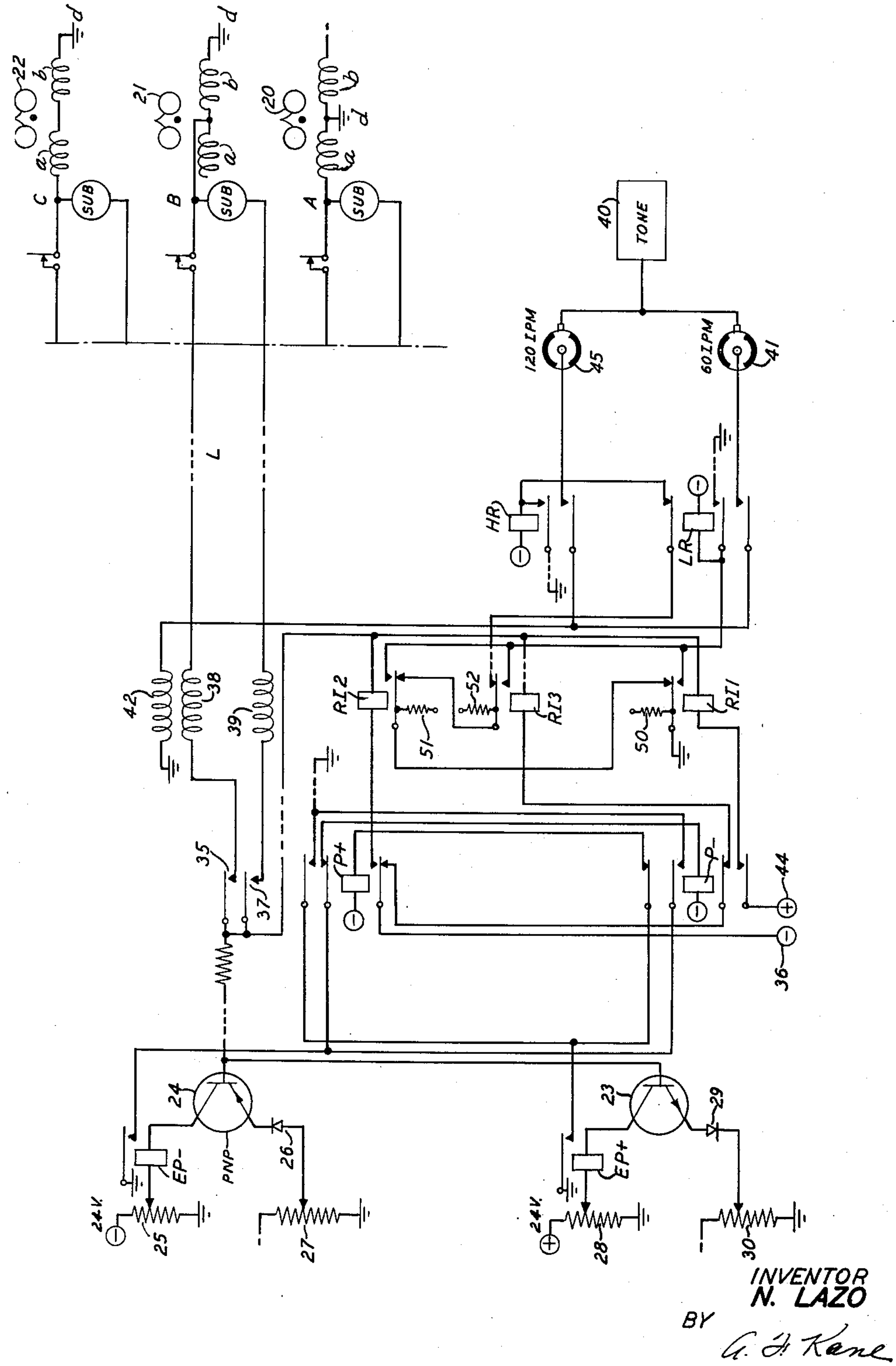
INVENTOR
N. LAZO
BY *G. H. Kane*
ATTORNEY

3,009,992
TEST CIRCUIT FOR TELEPHONE RINGERS

Nicholas Lazo, Rockville Centre, N.Y., assignor to Bell Telephone Laboratories, Incorporated, New York, N.Y., a corporation of New York Filed May 27, 1959, Ser. No. 816,100
7 Claims. (Cl. 179—175.2)

This invention relates to testing apparatus and systems and particularly to apparatus and systems for determining whether the call indicating device or ringer at a telephone subscriber's station on a multiparty line is correctly wired for party identification.

The telephone ringer in general use today at telephone subscribers' stations is equipped with a pair of windings of different impedances. It also includes facilities which enable an installer to connect either winding between the telephone line and earth potential at the subscriber's station, or to connect both windings in series to earth potential depending upon the type of system in which the ringer is to function. Facilities are available to the installer to initiate certain tests having to do with the functioning of the ringer and of other elements of which the subcriber's subset is constituted. Usually, such facilities involve a test circuit at a central office which is reached when the installer at the subscriber's station dials a particular code and which functions in response to the dialing of a directing digit to perform the particular test desired and designated by the directing digit dialed.

It is the object of this invention to further elaborate on and otherwise improve telephone testing facilities to include means whereby the wiring of a multiwinding telephone ringer at a subscriber's station may be automatically checked and the identification of the party on a multiparty line automatically determined.

The modern telephone ringer is designed to be readily adapted for use on telephone lines having different characteristics. This objective is attained by equipping the ringer with several windings of different impedances, any one of which or several in series may be effectively wired in the line so as to function, when energized, to actuate the associated audible signal device. The connection of the ringer windings or windings is usually made between one of the line conductors and earth potential at the subscriber's station. To determine which of the ringer windings or combination thereof is wired into the line circuit requires tests which discriminate between, or recognize the various impedances of the windings. It is known that the earth potential which is included in circuit with the ringer winding at a subscriber's station is susceptible to variations both in polarity and magnitude and is known to extend over a potential range generally between +10 volts and −10 volts. Such variations are caused by moisture conditions to which the telephone line is exposed; by neighboring power lines and similar extraneous influences. Such earth potentials, obviously, influence the results of any tests which are made on impedance devices which of necessity are connected in circuit with such potentials.

In accordance with a particular feature of this invention facilities, in a central office test circuit, are provided which function to evaluate the earth potential at a subscriber's station both as to its polarity and magnitude and then, in accordance with the evaluation made, to connect one of several relays in circuit with the ringer impedance and earth potential, said relay being so compensated as to operate only in the event that the ringer impedance is of a predetermined value.

These and other features of the invention will be readily understood from the following description when read with reference to the accompanying drawing, the single figure of which illustrates, schematically, a preferred embodiment of the invention.

At the extreme right of the drawing there are indicated three tip party substations A, B and C, each equipped with the same type of ringer designated by the numerals 20, 21 and 22. There are two coils or windings *a* and *b* for each ringer, the coil *a* being assumed, for descriptive purposes, to have an impedance of 1000 ohms and the coil *b* being assumed to have an impedance of 2650 ohms. It will be observed that a subscriber's station A the 1000 ohm winding *a* is connected between the telephone line L and earth potential *d*; at subscriber's station B the 2650 ohm winding *b* is connected between the telephone line L and earth potential *d*; and at subscriber's station C the two windings *a* and *b* are connected in series between the line L and earth potential *d*. These coil connections illustrate three possible ways in which the subset ringer windings may be wired in the line. Conditions prevail in the telephone plant which require that all three connections be available. Invariably, when an installer is delegated to install a telephone at a subscriber's premises he is furnished with directions as to which type of ringer connection must be made. Having made a connection, he checks to insure that the correct wiring has been made in a manner to be described hereinafter.

The remainder of the equipment shown in the drawing, is located at a central office and is adapted to be associated with the line L, which extends from the central office to the subscriber's stations, in a manner to be described later.

The means for detecting the polarity and magnitude of the earth potential *d* at a substation includes a pair of transistors 23 and 24 the former being an NPN type and the latter a PNP type. Each transistor includes the usual base, emitter and collector elements. The collector circuit of transistor 24 includes the winding of relay EP− and a potentiometer 25, one terminal of the resistor of which is connected to ground and the other terminal to negative 24 volts battery. The emitter circuit of transistor 24 includes the dry rectifier 26 and the calibrating resistor 27. Similarly, the collector circuit of transistor 23 includes the winding of relay EP+, the potentiometer 28 and a positive 24 volt battery, and the emitter circuit includes the dry rectifier 29 and the calibrating potentiometer 30.

As hereinbefore indicated, the earth potential *d* at a subscriber's station has been found to vary between +10 and −10 volts. In the present invention this range of potential is divided into three areas, one covering the potential range from +10 volts to +3 volts, a second one covering the potential range from +3 volts to −3 volts and a third one covering the potential range of −3 volts to −10 volts. By means of the calibrating resistor 30 the NPN transistor 23 is adjusted so that collector current will flow through the winding of relay EP+ to effect the operation of the relay when the potential applied to the base element of the transistor is in the range of +10 to +3 volts, while the calibrating resistor 27 is so adjusted as to permit sufficient current to flow in the collector circuit of transistor 24 to operate relay EP− when the potential applied to the base element of the transistor is in the range of −3 to −10 volts. When a voltage within the intermediate range of +3 to −3 volts is applied to the base elements of the transistors 23 and 24, neither transistor functions and neither relay EP+ nor relay EP− operates. Relay EP+ controls the operation of relay P+ whereas relay EP− controls the operation of relay P−.

Relays P+ and P− control the operation of ringer identification relays RI1, RI2 and RI3 in a manner to be described presently. Suffice it to say at this time that these relays are so preadjusted that they will operate when included in the telephone line L, under predetermined conditions of earth potential at the subscriber's station, only when the connected ringer winding at the substation is of a predetermined impedance, such as 1000 ohms. Such adjustments may be made by regulating the tension on springs 50, 51 and 52. The ringer identification relays control the operation of relays HR and LR which, in turn, serve to connect tone signals, respectively, to the line L as will be described in detail presently.

It will now be assumed that an installer at the subscriber station A has completed the installation of a telephone set at the station and desires to check whether or not the ringer has been correctly wired to the line, it having been predetermined that correct wiring in this instance necessitates the inclusion of only the 1000 ohm ringer winding *a* in the circuit. To make this check the installer removes the telephone handset from its support, dials a three digit code to reach the test circuit at the central office and then dials a single directing code to tell the test circut to make the desired ringer test. It is not deemed necessary to illustrate the circuitry and apparatus which respond to the dialing of these codes since such equipment and the dialing procedures are well known in the art. Suffice it to say that in response to the dialing of the single directing code, contacts 35 are closed to associate the central office test equipment of this invention with the telephone line L, the tip and ring conductors of which are combined and terminate at the contacts 35. It will now be assumed that the ringer wiring has been correctly made, that is, the 1000 ohm winding *a* has been wired so that one of its terminals is connected to the line L and the other terminal is connected to earth potential *d* which, for descriptive purposes is now assumed to be within the +10 to +3 volts. Under the assumed conditions, the potential applied to the base element of transistor 23 is of such polarity and magnitude as to permit sufficient current to flow to effect the operation of relay EP+. The operating circuit for relay EP+ may be traced from the positive 24 volt source, through a portion of potentiometer 28, through the winding of relay EP+, through the collector and emitter elements of transistor 23, to ground by way of dry rectifier 29 and the calibrating resistor 30. The potential applied to the base element of transistor 24 is of such polarity as to render the transistor non-conducting.

At its armature and front contact, relay EP+ completes an operating circuit for relay P+ which may be traced from negative battery, through the winding of relay P+, over the back contact and outer upper armature of relay P−, over the front contact and armature of relay EP+ to ground.

Relay P+, at its outer upper armature and front contacts, locks to ground. At its inner upper armature and back contact, it opens the operating circuit of relay P−, and at its lower armature and front contact, it completes a circuit which includes the negative potential source 36, the lower armature and front contact of relay P+, the winding of relay RI2, contacts 37, which are closed incident to the dialing of the single directing code, the repeating coil windings 38 and 39 in parallel, the tip and ring conductors of line L, the substation circuit including the now closed receiver switchhook contacts at station A, the 1000 ohm ringer winding *a* and earth potential *d* which, as assumed, is in the range of +10 to +3 volts. As previously mentioned, relay RI2 is adjusted so that it will operate only if the impedance of the connected ringer winding is 1000 ohms. Relay RI2, therefore, now operates and completes a circuit which includes negative battery, the winding of relay LR, front contact and armature of relay RI2, back contact and armature of relay RI1 and ground.

At its inner lower armature, relay LR locks to ground. At its upper armature and back contact, it opens the operating circuit for relay HR and at its outer lower armature and front contact, it completes a circuit which includes the tone source 40, the 60 i.p.m. interrupter 41, the front contact and outer lower armature of relay LR, and ground by way of the coil 42 which is inductively associated with the repeating coil winding 38. Tone from the source 40, interrupted at the rate of 60 interruptions per minute is thus transmitted over the line L to be heard by the installer at subscriber's station A. The installer recognizing this as a 60 i.p.m. tone signal is apprised of the fact that the 1000 ohm ringer winding is connected to the line and the ringer has been correctly wired in circuit.

Had the earth potential *d* at the subscriber's substation been in the −3 to −10 volt range, relay EP−, instead of relay EP+, would have operated and would have caused relay P− to operate and connect the winding of relay RI1 in series with the positive potential source 44 to the line L, and since relay RI1 is adjusted, as previously stated, to operate only when the connected ringer winding is 1000 ohms under the earth potential condition encountered, the relay would function to operate relay LR. Relay LR, as described above, functions to effect the transmission of a tone signal over the line L to apprise the installer that the ringer was correctly wired in circuit.

Had the earth potential *d* at the subscriber's station been within the +3 to −3 range neither relay EP+ nor relay EP− would operate, so that relays P+ and P− would also be unoperated. Under this condition, the negative potential source 36 would be connected to the line L in series with the winding of relay RI3 by way of normal armature contacts of relays P+ and P−. Relay RI3 would operate and complete an operating circuit for relay LR which circuit includes normal armature contacts of relays RI2 and RI1. Relay LR connects the tone signal to the line as is now apparent.

It will now be assumed that instead of connecting the 1000 ohm ringer winding *a* in circuit at substation A the installer had erroneously connected the 2650 ohm ringer winding *b*, a condition illustrated at subscriber station B. With the earth potential in the +10 to +3 volt range, relay EP+ would operate as before and through relay P+ would effect the connection of relay RI2 to line L in series with the negative potential source 36. Relay RI2, however, being adjusted to operated only when the 1000 ohm ringer winding *a* is connected in series with it, does not operate under this condition. With relay RI2 normal, relay HR operates in a circuit which includes negative battery, the winding of relay HR, back contact and upper armature of relay LR back contact and armature of relay RI3, back contact and armature of relay RI2, back contact and armature of relay RI1 and ground. Relay HR locks to ground and at its outer armature and front contact, connects the tone source 40, by way of the 120 i.p.m. interrupter 45, to the coil 42, thereby causing the transmission of a high tone signal to the subscriber's substation indicating to the installer that the ringer has been incorrectly wired to the line. The correction would then be made and a recheck made.

Should the earth potential be other than in the range of +10 to +3 volts the system would function as previously described except that the tone signal, resulting from the operation of relay HR would, in each instance, be transmitted to the station.

In the event the condition illustrated at substation C in the drawing prevails, that is, in the event both ringer windings are connected in series between the line L and earth potential the results will be the same as when the 2650 ohm winding of the ringer is connected as shown at substation B. That is, the test circuit functions in a manner such that none of the relays RI1, RI2 and RI3 will operate when connected to the line L and the tone relay HR will operate to connect the high tone signal to the line to thus advise the installer at the substation that the ringer is incorrectly wired to the line.

It will be observed that whenever the test circuit functions to connect one or the other of the potential sources 36, 44 to the line, the polarity of the connected potential will be such as to augment the earth potential at the subscriber's station in all cases except where the earth potential is in the range of 0 volts to −3 volts, in which case the connected potential and the earth potential would be in opposition. Thus, the effective potential on the line which serves to operate whichever of relays RI1, RI2 or RI3 is connected to the line will be the potential of the connected source 36 or 44 increased by the earth potential at the substation except where the earth potential is in the range of 0 volts to −3 volts.

What is claimed is:

1. In combination, a telephone line, a subscriber's station on said line, a central office, a signal device at said station having a pair of windings of different impedances, means at said station for connecting either of said windings between said line and earth potential at said station or both said windings in series between said line and earth potential at said station, the earth potential at said station adapted to range between positive and negative potentials of known maximum values, a test circuit at said central office connected to said line, a first means in said test circuit responsive to the connection of one or the other or both said windings between said line and earth potential at said subscriber's station to operate only when the earth potential is positive and within predetermined upper and lower limits, a second means in said test circuit responsive to the connection of one or the other or both said windings between said line and earth potential at said subscriber's station only when the earth potential is negative and within predetermined upper and lower limits, a source of positive potential and a source of negative potential at said central office, first, second and third relays in said test circuit, means controlled by said first means, when operated, for connecting said negative source of potential to said line by way of the winding of said first relay, means controlled by said second means, when operated, for connecting said positive source of potential to said line by way of the winding of said second relay, means effective incident to the failure of either of said first or second means to operate for connecting one of said sources of potential to said line by way of the winding of said third relay, and means for rendering said first, second and third relays responsive to the connection of said potential sources to said line only when the said connected winding or windings at said subscriber's station presents a predetermined impedance to said line, a source of tone current, and means controlled by said first, second and third relays for connecting said tone source to said line.

2. In combination, a telephone line, a substation on said line, a signal device at said station having a plurality of windings, means connecting one of said windings between said line and earth potential at said station, each of said windings having a different impedance and said earth potential adapted to range between upper and lower positive and negative values, means at a point remote from said station comprising a pair of oppositely poled transistors connected to said line for detecting the polarity of the earth potential at said station and its magnitude within upper and lower limits, a source of positive potential at said remote point, a source of negative potential at said remote point, means controlled by said detecting means for selectively completing a series connection between the connected one of said windings and one or the other of said potential sources by way of said line, signal means, and means included in the series connection completed by said detecting means and responsive to its completion to operate said signal means only when the connected one of said signal device windings is of a predetermined impedance.

3. The combination in a system of party line identification in which a signal device at each of a plurality of subscriber stations includes a winding of different resistance connected between a conductor of the line and ground potential and ground potential at the stations ranges between upper and lower positive and negative values, of a multiparty line, a plurality of stations on said line, a signal device at each of said stations having a winding of different predetermined impedance connected between a conductor of said line and ground potential at said station, means at a point remote from said stations for detecting the polarity of the ground potential at said station and its magnitude within predetermined upper and lower limits, a source of positive potential at said remote point, a source of negative potential at said remote point, means controlled by said detecting means for selectively connecting one of said potential sources to said line in accordance with the detected polarity of the ground potential to complete a series circuit including the winding of the signal device at a station and the ground potential thereat, signal means, and means included in said series circuit for operating said signal means.

4. In combination, a telephone line, a subscriber's station connected to said line, impedance means at said station of a predetermined impedance value, means for connecting said impedance means to said line and to earth potential at said station, and means remote from said station for testing said station to determine said impedance means impedance value, said testing means including means for detecting the polarity and magnitude of said earth potential at said station, a plurality of relays each having its operating winding connected to said line, means responsive to said detecting means for applying an energizing source to a particular one of said relay windings dependent on said polarity and magnitude of said earth potential at said station, and means controlled by said impedance means impedance value connected by said line to said particular one of said relay windings for determining the operation of said particular one relay.

5. The combination of claim 4 wherein said detecting means includes a pair of opposite conductivity transistors connected to said line and means biasing said transistors for conduction on application to said transistors of earth potentials at said station of predetermined minimal values of opposite polarity.

6. The combination of claim 5 wherein said means for applying an energizing source to said relay windings includes a pair of second relays, means operating one of said second relays on conduction of one of said transistors and for operating the other of said second relays on conduction of the other of said transistors, and means for connecting an energizing source to said particular one of said relay windings of opposite polarity to the polarity of said detected earth potential at said station when said detected potential is greater than said predetermined minimal value.

7. In combination, a telephone line, a subscriber's station connected to said line, a call indicator at said station and including winding means of a predetermined impedance value, means for connecting said winding means to said line and to earth potential at said station, said earth potential being of different possible magnitudes and polarities, and means remote from said station for testing said station to determine that said winding means is of the proper impedance value, said testing means including means for detecting the polarity and magnitude of said earth potential at said station within at least three possible ranges, three relays each having its operating winding connected to said line, a pair of sources of opposite potentials, means responsive to said detecting means for connecting a first of said sources to a first of said relay windings when said ground potential is in a first range and of polarity opposite that of said first source, for connecting the second of said sources to a second of said relay windings when said ground potential is in a second range and of polarity opposite that of said second source, and for connecting one of said sources to the third of said relay windings when said ground potential is in the third range, and means controlled by said winding impedance value connected by said line to said relay windings for determining the operation of said relay windings.

References Cited in the file of this patent

UNITED STATES PATENTS

| | | |
|---|---|---|
| 2,277,623 | Allen | Mar. 24, 1942 |
| 2,848,547 | Hemel | Aug. 19, 1958 |